March 10, 1942.   H. H. DUERR ET AL   2,275,617
PHOTOGRAPHIC STRIPFILM AND STRIPFILM PAPER
Filed July 20, 1939
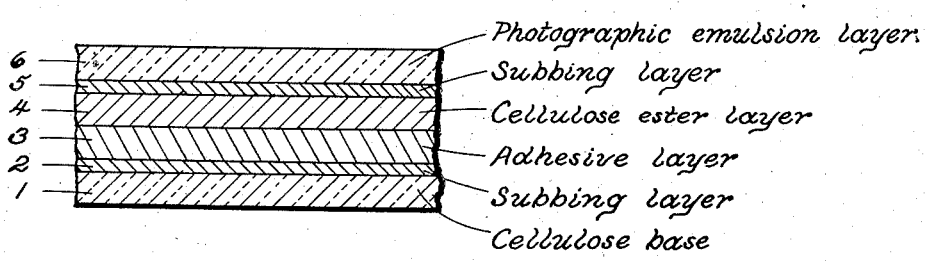
- 6 — Photographic emulsion layer
- 5 — Subbing layer
- 4 — Cellulose ester layer
- 3 — Adhesive layer
- 2 — Subbing layer
- 1 — Cellulose base
Herman H. Duerr
F. W. Hellmut Mueller
INVENTORS
BY
THEIR ATTORNEYS Patented Mar. 10, 1942

2,275,617

UNITED STATES PATENT OFFICE 2,275,617

PHOTOGRAPHIC STRIP FILM AND STRIP-FILM PAPER

Herman H. Duerr and Fritz W. Hellmut Mueller, Binghamton, N. Y., assignors, by mesne assignments, to General Aniline & Film Corporation, New York, N. Y., a corporation of Delaware Application July 20, 1939, Serial No. 285,498

6 Claims. (Cl. 95—9)

The present invention relates to photographic stripfilm or stripfilm paper.

So called photographic stripfilm, as is known, essentially comprises, in the order of their arrangement, a temporary support, a stripping or adhesive layer, a permanent support and a photographic emulsion. The prior art has proposed to utilize as the substance for the stripping or adhesive layer soluble gelatines, glues, dextrins and the like. The use of these substances provides very serious objections. The most important of these is the fact that, due to the relatively weak adhesion between the temporary and permanent support afforded by such substances, there is danger of the film being subjected to what is known as "dry peel," that is a loosening of the permanent support from the temporary support before use of the material. There is also the possibility when using such adhesives that undue weakening of the joint between the supports will be prematurely effected during processing, as, for instance, in the developer, thus making it difficult to handle the film in the further processing steps.

A further objection occasioned by the utilization of such adhesives is the necessity of using a water-permeable material in the manufacture of the permanent support to insure quick wetting of the adhesive and facilitate stripping. The material usually employed in this relationship is cellulose. Water-permeable cellulose layers are subject to greater dimensional changes than shrinkage-proof nitro-cellulose layers and the like.

It is an object of this invention to provide an adhesive for use in stripfilms and stripfilm paper which will have the prerequisites necessary to avoid the aforementioned objections.

A further object of this invention is to provide an adhesive which is unstable in neutral or acid sodium thiosulfate fixing baths.

A further object is the provision of an adhesive having such a high affinity for water that it becomes wetted by the water contacting the film at the edges thereof.

Further and other objects will become apparent as the description proceeds.

We have found that adhesives essentially comprising certain hemi-celluloses, such as vegetable mucilages and pecto-celluloses, answer all of the requirements necessary for adhesives for photographic stripfilm and stripfilm paper. Examples of such substances are extracts of *Laminaria algae*, related algae and similar marine plants, extracts from fruits containing pectines and the like. Probably the best known of such substances are alginic acid, laminaric acid, tangic acid and the salts thereof, particularly the sodium and ammonium salts. For a discussion of laminaric acid and tangic acid attention is directed to the "Handbuch der Organischen Warenkunde" by Dr. Victor Grafe II, 21 page 726 (1928) or Ullmann Enzyklopaedie der Technischen Chemie, vol. 8, page 141. All of these substances have a highly colloidal, strongly viscous and adhesive character. According to textbooks of organic chemistry, many of them yield not only hexoses but also pentoses, the latter being formed apparently by secondary reaction during the complete hydrolysis. A further common characteristic of these substances is that they yield, inter alia, mucic acid upon oxidation. All of these substances have likewise a very high affinity for water. In fact said affinity is so high that sufficient water for swelling of the adhesive with a weakening of the joint between the supports is attracted from the edges of the film by capillary attraction. Another important property possessed by the adhesives is their ability to form highly viscous solutions, therefore permitting their application in small concentrations.

The most important property, which is also the most peculiar, is the reaction of these substances to neutral and acid sodium thiosulfate solutions. From a knowledge of the adhesive properties of these substances it could not have been expected that upon being contacted with a sodium thiosulfate fixing bath, a solution thereof would be effected to an extent permitting a stripping of the supports. On the contrary, it would have been taken for granted that substances like sodium alginate or sodium pectate, for instance, upon contacting a fixing bath of normal acidity would be converted to the insoluble free acid, thus forming an insoluble adhesive layer. As will be self-evident, such layers prohibit stripping. To say the least then, it was decidedly surprising that solutions of the aforementioned substances showed a much greater decrease in viscosity upon the addition of thiosulfate fixing solutions than upon the addition of an equal quantity of water. The decrease in viscosity which is so occasioned, reduces the adhesive strength of the layer, apparently by increasing its solubility in water, thus insuring excellent strippability.

The peculiar behavior of the substances in this connection led us to study the same carefully. We have been convinced by our study that the effect above noted cannot be attributed to the known effect of electrolytes alone upon the viscosity of colloidal solutions. Thus, when employing such colloids as agar-agar, extracts from carageen (*Chondrus crispus*), from psyllium seed, from lichen (*Cetraria Icelandica*), of polyglucuronic acid, either the viscosity was decreased only to a small extent or no decrease in viscosity occurred. In some cases even an increase in viscosity was observed.

It has been stated above that this property is one of the most important of the properties possessed by our adhesives. This statement is predicated upon the finding that those colloids which do not possess this property were found unsuitable for the adhesive layers because with them the required strippability for stripfilm cannot be attained.

It will be appreciated from what has been said that the properties of the adhesive substances are such that their adoption in making the adhesive layers for stripfilm and stripfilm paper obviates completely the objections which manifested themselves when employing the adhesives formerly used. Thus the high adhesive character insures a strong bond between the permanent and temporary supports. The high affinity of the adhesives for water eliminates the necessity of utilizing undesirable water-permeable permanent supports. The viscous nature of the adhesive solutions permits their use in small concentrations. The instability of the adhesives to the fixing baths insures that after contact with the fixing bath the supports may be readily stripped from each other despite the strong bond between the supports present up to this point. Two to three minutes in the fixing bath, for instance, are sufficient to destroy the adhesive properties of the layer to a degree that the film may be stripped easily without leaving any insoluble residue. However, the adhesive properties of the layer remain high enough to allow, if desired, subsequent washing and dry stripping.

Other agents may be included in the adhesive if desired. For instance, agents facilitating spreading such as sulfonated carboxylic acid amides, such as described in U. S. P. 1,932,179, and agents favoring the retention of moisture, such as aqua resin, which is described in U. S. P. 1,953,741, glycerine and the like, may be added.

Our invention will be further illustrated by the following examples when taken with the accompanying self-explanatory drawing depicting a section through a film. It is to be understood, however, that the examples are illustrative and that our invention is not limited thereto.

Example 1

.2 to .6 gram of sodium alginate are dissolved in 60 parts of water and 40 parts of alcohol added and then coated with the addition of small amounts of an amide as described in U. S. P. 1,932,179, and glycerine on the subbing layer of the temporary support 1. There is then superimposed on said adhesive a permanent support 4 composed of cellulose nitrate or -acetate, and provided with a subbing layer 5 to insure permanent adhesion of the emulsion layer 6. A film so constructed will be found to be free from any danger of "dry peel" and to possess an excellent strippability when contacted with acid or neutral sodium thiosulfate fixing baths.

Similar results are obtained when utilizing ammonium alginate as the adhesive material, and aqua resin as the water-retaining medium.

Example 2

An adhesive is made from a .2 to .3% solution of pectin in water and 20-40% alcohol are added and coated in the manner described in Example 1.

Example 3

An adhesive is made by dissolving a mixture of sodium alginate and pectin in water to produce a .2 to .6% solution. The adhesive is then coated as in Example 1.

The same results are obtained with a mixture of ammonium alginates and pectin.

Example 4

An adhesive is made as described in Examples 1, 2 or 3 to which there is added 10-20% of a suitable antihalation dye, as, for instance, acid magenta, tartrazine, or a dye according to U. S. P. 2,147,112. This composition is then coated on the subbing layer of the temporary support 1 as described in Example 1.

It is realized, of course, that it has been proposed in the past to use alginates as adhesives. Such a proposal is found in U. S. P. 2,047,978 wherein decalcomania paper is provided with such an adhesive. The purpose of using the alginates in the patented procedure, however, is to secure a permanent bond (lines 14 et seq., col. 2, page 1). It will be appreciated that the purpose of the patentee is entirely distinct from our procedure, for the reason that we have selected, inter alia, the alginates as adhesives in our stripfilm and stripfilm paper because of the possibility of readily destroying the bond created thereby by contacting the adhesive with acid or neutral sodium thiosulfate fixing baths. Other than the fact that alginates are used as adhesives in the two cases, there is no parallel between the involved procedures.

It will be understood that various modifications of our invention may be effected and, therefore, we do not intend to be limited in the patent granted except as regards the prior art and the appended claims.

We claim:

1. Photographic stripfilm or stripfilm paper comprising a temporary support, a permanent support carrying a light-sensitive emulsion and an adhesive layer between said supports, acting to maintain the supports united, at least until the film or paper is fixed, said adhesive essentially comprising a substance, the viscosity of which is decreased and the solubility in water of which is increased by acid or neutral thiosulfate fixing solutions, and being selected from the class consisting of alginic acid, laminaric acid, tangic acid, pectic acid and their water-soluble salts.

2. Photographic stripfilm or stripfilm paper as defined in claim 1, wherein the salts are the sodium and ammonium salts.

3. Photographic stripfilm or stripfilm paper as defined in claim 1, wherein the adhesive contains a sulfonated carboxylic acid amide and a water-retaining agent.

4. Photographic stripfilm or stripfilm paper as defined in claim 1, wherein the adhesive essentially comprises an alginate.

5. Photographic stripfilm or stripfilm paper as defined in claim 1, wherein the adhesive essentially comprises a pectate.

6. Photographic stripfilm or stripfilm paper as defined in claim 1, wherein the adhesive essentially comprises tangic acid.

HERMAN H. DUERR.
F. W. HELLMUT MUELLER.